United States Patent [19]

Barclay et al.

[11] Patent Number: 4,557,637

[45] Date of Patent: Dec. 10, 1985

[54] SOLIDS TRANSFER SYSTEM

[75] Inventors: John L. Barclay, Tadworth; Geoffrey C. Stevens, London; Brian Stokes, Sunbury-on-Thames; Denis S. Ward, Walton-on-Thames, all of England

[73] Assignee: The British Petroleum Company Limited, London, England

[21] Appl. No.: 552,425

[22] Filed: Nov. 16, 1983

Related U.S. Application Data

[63] Continuation of Ser. No. 70,441, Aug. 28, 1979, abandoned.

[30] Foreign Application Priority Data

Sep. 13, 1978 [GB] United Kingdom ............... 36696/78
Jun. 15, 1979 [GB] United Kingdom ................ 7921042

[51] Int. Cl.$^4$ .............................................. B05B 7/14
[52] U.S. Cl. ............................ 406/153; 239/DIG. 7; 239/405; 239/8
[58] Field of Search ........................ 222/1, 630, 637; 239/DIG. 7, 8, 11, 405; 137/803, 806, 807; 406/153, 144; 415/DIG. 1

[56] References Cited

U.S. PATENT DOCUMENTS

| | | |
|---|---|---|
| 2,052,869 | 9/1936 | Coanda .......................... 239/DIG. 7 |
| 3,047,208 | 7/1962 | Coanda . |
| 3,787,006 | 1/1974 | Coanda . |
| 4,009,912 | 3/1977 | Mraz ................................... 406/153 |
| 4,037,991 | 7/1977 | Taylor . |
| 4,060,355 | 11/1977 | Waltz et al. .................. 239/DIG. 7 |
| 4,090,666 | 5/1978 | Peck ..................................... 239/405 |

FOREIGN PATENT DOCUMENTS

| | | |
|---|---|---|
| 5097173 | 7/1974 | Australia . |
| 685544 | 11/1939 | Fed. Rep. of Germany ............ 144/ |
| 1089937 | 11/1967 | United Kingdom . |

Primary Examiner—H. Grant Skaggs
Attorney, Agent, or Firm—Morgan, Finnegan, Pine, Foley & Lee

[57] ABSTRACT

Apparatus for transferring solid particles to a receptacle comprises a loading tube (2) surrounded at or near its base by a gas supply chamber (7) terminating in a Coanda surface (9). A slot (10) between the outlet from the loading tube (2) and the beginning of the Coanda surface (9) forms a Coanda nozzle. A throttle (3) is preferably fitted in the loading tube (2) to form an annulus (4) down which the particles flow to the slot (10). A gas supply line (8) preferably enters a gas supply (7) tangentially to supply gas to the Coanda nozzle. The apparatus is particularly suitable for loading catalyst into a reactor.

7 Claims, 2 Drawing Figures

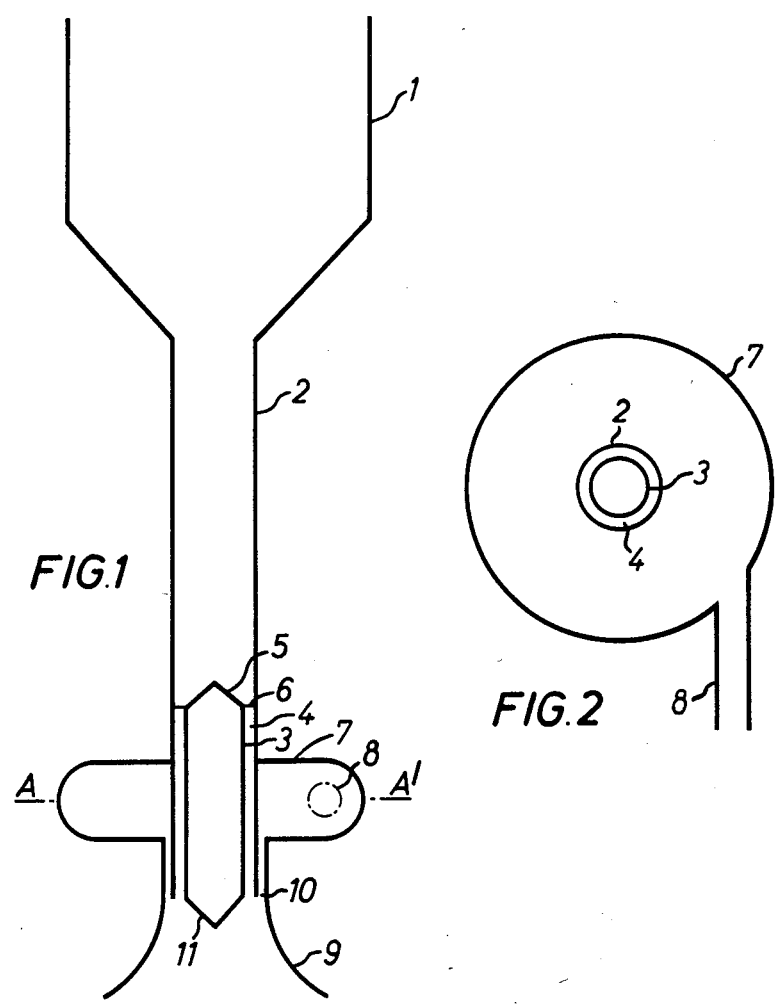

SOLIDS TRANSFER SYSTEM

This is a continuation of application Ser. No. 070,441 filed Aug. 28, 1979, now abandoned.

This invention relates to a system for transferring solids, in particular for loading catalyst to a reactor.

In the petroleum refining and chemical industries catalytic processes are employed which require reactors to be loaded with catalyst. The catalyst must be removed and replaced periodically.

In a typical loading procedure, the catalyst is first lifted to the top of the reactor in drums or larger containers. It is then poured into a hopper and down a "sock" into the reactor. The "sock" is a long flexible tube, one end of which is maintained just above the level of the catalyst bed, which is raised as the catalyst level within the reactor rises during the loading operation. From time to time the catalyst bed has to be raked over to ensure level filling.

It is necessary for a man to enter the reactor to perform this work. This gives rise to problems in designing reactors to permit entry. Furthermore, the work is unpleasant and tends to damage the catalyst. It is difficult to ensure even loading to prevent voidage and therefore it is found that this method of loading leads to low values of catalyst charging density. This may cause poor unit performance either because there is a lower weight of catalyst in the reactor or because the bed slumps during use leaving a void at the top.

It is known that when the extension of one lip of the mouth of a slot through which a fluid emerges under pressure progressively diverges from the axis of the exit of the slot, the stream of fluid emerges from the slot tends to stick to the extended lip. This effect creates a pressure drop in the surrounding fluid, which causes fluid flow towards the low pressure region. This physical phenomenon is known as the Coanda effect and a body exhibiting this effect is known as a Coanda body.

A Coanda nozzle may be defined as a nozzle capable of discharging a fluid at high pressure into another fluid of low pressure through a narrow slot of chosen dimensions having a surface of a Coanda body substantially contiguous with one wall of the slot.

We have now discovered a method of transferring solid particles to a receptacle utilising the Coanda effect to spread descending solid particles so that they distribute evenly across the receptacle.

Thus according to the present invention there is provided apparatus for transferring solid particles to a receptacle which apparatus comprises a loading tube surrounded at or near its base by a glass supply chamber terminating in a Coanda surface, a slot between the outlet from the loading tube and the beginning of the Coanda surface forming a Coanda nozzle.

Preferably the loading tube contains at its lower end a cylinder co-axially aligned within it to provide an annulus for the passage of solid particles. This cylinder will subsequently be termed a throttle.

The throttle serves to direct particle flow close to the Coanda nozzle and to control the rate of supply of the particles.

In use, the annulus fills with particles and combats the tendency of the atmosphere to pass down the loading tube into the region of the Coanda nozzle.

Alternatively, this effect can be achieved without a throttle by using a loading tube of smaller diameter.

A gas supply line preferably enters the gas supply chamber in a tangential manner.

The apparatus is particularly useful for loading catalyst to a reactor and achieving a high charging density. The catalyst may be in the form of granules, cylinders or spheres up to ⅛ inch in diameter.

According to another aspect of the present invention there is provided a method for transferring solid particles to a receptacle which method comprises the steps of allowing particles to flow down a loading tube, supplying gas to a chamber terminating in a Coanda nozzle surrounding the outlet of the loading tube and entraining particles at or near the base of the loading tube in a stream of gas emerging from a Coanda nozzle in such manner that the particles are substantially uniformly distributed over the cross sectional area of the receptacle.

Preferably the particles are allowed to drop down an annulus in the loading tube prior to entrainment.

In most circumstances air will be a suitable motive fluid but under hazardous conditions an inert gas such as nitrogen can be employed.

The spread of particles achieved by the entrainment is a function of many variables including the geometry of the system, e.g., the diameter of the loading tube, the width of the Coanda slot, the shape, e.g., radius, of the Coanda surface, the rate of particle supply and the pressure of the gas supply. These variables can readily be adjusted to give the desired uniform distribution.

Suitably the width of the slot is in the range 0.1 to 3.0 mm, preferably 0.2 to 2.0 mm. Suitably the width of the annulus is in the range 3 to 25 mm, preferably 5 to 20 mm.

In particular, it is preferred that the gas is introduced tangentially into the gas chamber surrounding the loading tube.

The gas pressure is an easy variable to adjust and by adjusting it the distribution of the particles below the discharge end of the loading device can be varied.

However, the gas pressure can be maintained constant if desired and in many cases this will be the simplest method of operation.

A suitable gas pressure is in the range 0.35 to 7 bars (ga), preferably 0.7 to 3.5 bars (ga).

A particular advantage of the operation of the loading apparatus according to the present invention is that it provides a method of packing a reactor uniformly without necessarily lowering or raising the loading tube during the packing. Thus initially during the loading procedure the gas flow can be adjusted so that the particle distribution by the time the particles reach the bottom end of the reactor to be packed is satisfactory. As the level of packed particles rises within the reactor, the gas flow can be re-adjusted to ensure satisfactory distribution is maintained.

The rate of particle transfer may be controlled by altering the diameter of the throttle or by adjusting the position of a cone partially obstructing the outlet from the loading tube.

The invention is illustrated with reference to FIGS. 1 and 2 of the accompanying drawings wherein FIG. 1 is a schematic diagram of a catalyst loading device and FIG. 2 is a section of A.A' of FIG. 1.

Catalyst is contained in a storage hopper 1 into the exit of which is fitted a loading tube 2 containing a throttle which forms an annulus 4 with the tube 2. The throttle 3 is topped by a conical cover 5 and is positioned by supports 6.

At its lower end, the tube 2 is surrounded by an air supply chamber 7 fed by a supply line 8. The exit from the chamber 7 develops into a Conada surface 9. A slot 10 is formed between the exits from the tube 2 and the chamber 7 and co-operates with the Coanda surface 9 to form a Conada nozzle.

At its lower end, the throttle 3 terminates in a conical cover 11.

In use, a stream of air enters the chamber 7 tangentially through the line 8. The air is then forced out of the Coanda slot 10 and follows the Coanda surface 9 adjacent to the slot 10 producing a swirling cone of air.

Catalyst particles contained in the hopper 1, drop down the annulus 4 and are entrained by the air flow around the slot 10 and evenly distributed over the base of the reactor (not shown).

In a prototype apparatus made in heat-resistant glass, good particle spreading was obtained with the following dimensions:

| | |
|---|---|
| Diameter of loading tube (2) | mm:33 |
| Width of slot (10) | mm:1 |
| Radius of Coanda surface (9) | mm:5 |
| Diameter of vessel being loaded | mm:600 |

The prototype did not contain a throttle cylinder (3). A catalyst loader was constructed from mild steel and possessed the following dimensions.

| | |
|---|---|
| Internal diameter of loading tube (2) | mm:95 |
| Height of loading tube (2) | mm:915 |
| External diameter of throttle (3), Example 1 | mm:76 |
| External diameter of throttle (3), Examples 2-5 | mm:70 |
| Total height of throttle (3), apex to apex | mm:200 |
| Height of straight side of throttle (3), | mm:160 |
| Width of slot (10) | mm:0.25 |
| Radius of Conada surface (3) | mm:15 |

EXAMPLE 1–5

The catalyst loading device, shown diagrammatically in FIGS. 1 and 2 was used to load a typical commerical 1.5 mm extrudate cobalt molybdate/alumina catalyst. Batches (100 kg) of the catalyst were loaded into a circular vessel, 1.2 m in diameter, with the distributor nozzle located centrally 700 mm above the base of the vessel.

Five batches of catalyst were loaded to determine, in each case, the catalyst packing density and loading rate. The catalyst packing density was taken as the average of five bulk densities determined from samples taken from around the catalyst bed. These samples were collected in graduated containers, one sampler being at the centrebase of the loading vessel with the others located at the cardinal points on a circle of radius 380 mm around it. Apart from start and end of loading, the level of catalyst in the feed hopper was kept constant. The results are given in the Table.

The catalyst packing density was 0.63 g/ml, an increase of 12.5% over the quoted figure of 0.56 g/ml obtained by the conventional loading technique. The loading rates 0.5–1 tonne/hour were dependent on the annulus gap between the throttle and the loading tube, and may be reduced, or increased, if desired.

TABLE

| CATALYST PACKING DENSITY AND LOAD RATE | | | | |
|---|---|---|---|---|
| Example | Throttle Diameter (3) mm | Air Pressure bar | Catalyst Packing Density g/ml | Loading Rate te/h |
| 1 | 76 | 1.37 | 0.62 | 0.5 |
| 2 | 70 | 1.37 | 0.63 | 1.1 |
| 3 | 70 | 1.37 | 0.63 | 1.2 |
| 4 | 70 | 2.0 | 0.63 | 1.2 |
| 5 | 70 | 2.0 | 0.63 | 1.2 |

We claim:

1. Apparatus for transferring solid particles to a receptacle from a storage hopper by allowing said particles to flow and drop down in a loading tube provided with a cylinder disposed within the lower end thereof and forming an annulus therewith and fall freely from said annulus, said apparatus comprising a loading tube having an inlet and an outlet, a gas supply chamber terminating in a curved Coanda surface surrounding said loading tube at or near the base thereof, a slot located between the outlet of said loading tube and the beginning of said curved Coanda surface, said curved Coanda surface being substantially continuous with one wall of said slot and forming a Conada nozzle therewith, and a cylinder disposed within the lower end of said loading tube, coaxially aligned therewith and forming therewith an annulus to direct particle flow through said loading tube close to said Coanda nozzle and to control the rate of supply of particles.

2. Apparatus according to claim 1 including a gas supply line which enters the gas supply chamber tangentially.

3. Apparatus according to claim 1 wherein the width of the slot is in a range of from about 0.1 mm to about 3.0 mm.

4. Apparatus according to claim 1 wherein the width of the annulus is in a range of from about 3 mm to about 25 mm.

5. A method of transferring solid particles to a receptacle from a storage hopper using an apparatus which comprises a loading tube having an inlet and an outlet, a gas supply chamber terminating in a curved Coanda surface surrounding said loading tube at or near the base thereof, a slot located between the outlet of said loading tube and the beginning of said curved Coanda surface, said curved Coanda surface being substantially continuous with one wall of said slot and forming a Coanda nozzle therewith, and a cylinder disposed within the lower end of said loading tube, coaxially aligned therewith and forming therewith an annulus to direct particle flow through said loading tube close to said Coanda nozzle and to control the rate of supply of particles, said method comprising selecting the diameter of said loading tube, the width of said Coanda slot, the shape of said curved Coanda surface and the pressure of the gas supplied to said gas supply chamber to cause the particles to be entrained by the gas and to be substantially uniformly distributed over the cross-sectional area of said receptacle, allowing said particles to flow and drop down in said loading tube at a rate sufficient to fill said annulus therewith and fall freely from the annulus prior to entrainment by the gas and be uniformly distributed over the cross-sectional area of said receptacle.

6. A method according to claim 5 characterized by introducing the gas tangentially into the gas supply chamber.

7. A method according to claim 5 characterized by introducing gas under a pressure in the range of 0.35 to 7 bars (ga).

* * * * *